United States Patent [19]

Keusch et al.

[11] 4,167,229
[45] Sep. 11, 1979

[54] SCREW STRIP AND METHOD FOR FORMING THE SAME

[75] Inventors: Siegfried Keusch, Plochingen; Anton Abt, Oberboihingen, both of Fed. Rep. of Germany

[73] Assignee: Karl M. Reich Maschinenfabrik GmbH, Nuertingen, Fed. Rep. of Germany

[21] Appl. No.: 805,924

[22] Filed: Jun. 13, 1977

Related U.S. Application Data

[63] Continuation of Ser. No. 666,702, Mar. 15, 1976, abandoned.

[30] Foreign Application Priority Data

Mar. 22, 1975 [DE] Fed. Rep. of Germany ....... 2512825

[51] Int. Cl.² .............................................. B65D 85/24
[52] U.S. Cl. .................................... 206/343; 206/345; 206/379; 206/380; 206/443; 53/140
[58] Field of Search ............... 206/340, 341, 343, 345, 206/346, 347, 379, 380, 382, 383, 443; 53/3, 140

[56] References Cited

U.S. PATENT DOCUMENTS

| 2,503,518 | 4/1950 | Slaughter | 53/140 |
| 3,170,160 | 2/1965 | Burniston . | |
| 3,213,559 | 10/1965 | Matich . | |
| 3,432,985 | 3/1969 | Halstead | 206/346 |
| 3,463,304 | 8/1969 | Gallee et al. . | |
| 3,823,818 | 7/1974 | Shaw | 206/443 |

FOREIGN PATENT DOCUMENTS 2363974 8/1974 Fed. Rep. of Germany .

*Primary Examiner*—Ro E. Hart
*Attorney, Agent, or Firm*—W. G. Fasse; W. W. Roberts

[57] ABSTRACT

A screw strip for holding a row of parallel screws is formed of a flexible plastic material with sleeves which either only partially surround the screws, or have different wall thicknesses on different sides of the screws. The ribs interconnecting the sleeves have wall thicknesses less than the outer diameters of the screw threads. In a method for forming the screw strip, a plastic material is extruded only on one side of the threads of a row of screws, and it is then pressed by means of grooved rollers to be formed into the sleeves which only partially surround the screws.

7 Claims, 6 Drawing Figures

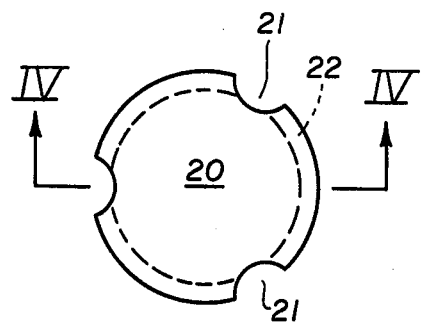
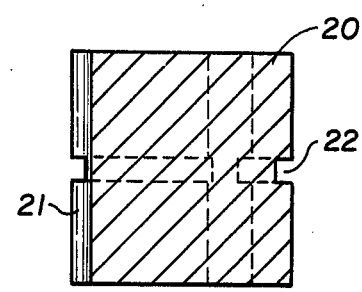
FIG.3      FIG.4
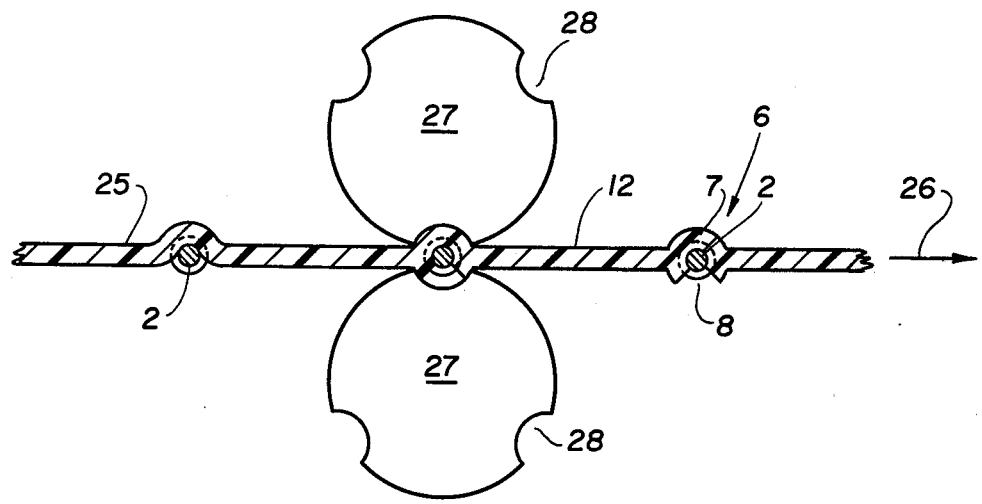
FIG.5
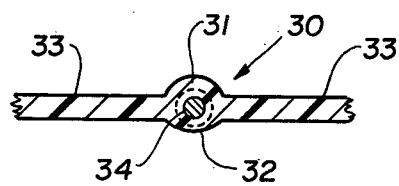
FIG.6

SCREW STRIP AND METHOD FOR FORMING THE SAME

This a continuation of application Ser. No. 666,702 filed Mar. 15, 1976, now abandoned.

BACKGROUND OF THE INVENTION

The present invention relates to screw strips adapted for use in screwing operations of screwing tools or machines, and is particularly directed to such screw strips and methods for making the same wherein a strip or belt of material is formed into sleeves, which at least partially surround the screw threads and are interconnected by ribs or the like.

In the past, screw strips for interconnecting screws have been formed of a retaining belt or strips of breakable plastic material. When a screw strip of this type is inserted in a conventional manner in the flat magazine of a screwing appliance or machine, the first screw to be screwed into a workpiece, along with a portion of the retaining strip, is separated from the screw strip by a screw blade, in the direction of the workpiece. The screw is then screwed into the workpiece. Parts of the separated retaining belt or strip thus drop onto the surface of the workpiece. Some of these parts may fall underneath the head of the screw, and thereby be pressed into the surface of the workpiece. Other parts of the broken strip fall loosely to the surface of the workpiece, and can be pressed into the surface of the workpiece when the screwing appliance or machine is moved, for example, for the next screwing operation. It is apparent that such dropping of the parts of the strip onto the workpiece is disadvantageous, and may result in damage to the surface of the workpiece. This is particularly true when the screwing appliance is employed for inserting screws in holes on the planed and sanded surfaces of furniture. In addition, the broken particles of the retaining strip can settle in the guide channel of the screwing tool when the machine is moved, for example, for the next screwing operation. It is apparent that such settling of the parts of the strip in the guide channel of the tool is disadvantageous and may result in damage to the screwing tool. In addition, the broken particles of the retaining strip can settle not only in the guide channel of the tool as mentioned above, but also in the front parts of the screw magazine whereby jamming may occur thus hampering the operation of the screwing tool.

When the screw strip is formed of a breakable plastic material, once the sleeve has been broken by the screw blade, it can no longer safely guide the screw in the cylindrical guide channel of the screwing appliance. As a result, the screw can tilt and thereby be screwed into the workpiece at an angle. In order to prevent such tilting of the screws, it has been necessary to provide guide jaws in the screwing appliance near the guide channel. Such guide jaws increase the costs of the screwing appliance, and are also subject to wear and breakdown.

OBJECTS OF THE INVENTION

In view of the above, it is the aim of the invention to achieve the following objects, singly or in combination:

to provide a screw strip which overcomes the above disadvantages of prior screw strips;

to provide a screw strip with sleeves and interconnecting ribs of a flexible material, whereby the flexible material will not be broken into pieces during screwing operations, so that the flexible material may be fed as a unit from the screwing appliance;

to provide a screw strip formed of sleeves and ribs of a flexible material, whereby the flexible material is not broken during a screwing operation and the sleeves therein serve to guide the screws during a screwing operation; and to provide a method for forming a screw strip, wherein the costs and effort of forming the screw strip is reduced by forming the sleeves therein to only partially surround the screws.

SUMMARY OF THE INVENTION

Briefly stated, the above objects are achieved, in accordance with the invention, by providing a screw strip formed of a row of a plurality of parallel spaced apart screws. The screws are held in separate sleeves of a strip of flexible material, the sleeves being interconnected by ribs.

The sleeves are provided with internal threads mating the threads of the screws, whereby the sleeves serve to guide the screws in a screwing operation.

The ribs of the flexible material have thicknesses less than the outer diameter of the screw threads, and the sleeves have wall thicknesses radially outwardly of the screw threads of lesser thickness than the depth of the screw threads. In addition, the sleeves either only partially surround the screw threads, or have different wall thicknesses on their opposite sides, so that the flexible strip may be deflected during a screwing operation, and not broken apart. As a consequence, portions of the flexible strip are not broken off, and this material is fed as a unit from the screwing appliance. Thereby, damage to the workpiece, as well as to the screwing appliance is avoided.

Due to this formation of the screw strip, the screw strip may be employed in screwing appliances having flat magazines. Alternatively, the screw strip may be spirally wound or at an angle whereby it may be employed in round or other shaped magazines, so that a larger number of screws may be loaded into the magazines.

In an advantageous process for forming the screw strips, a flexible plastic material is extruded on one side only of a row of parallel screws, and the extruded plastic material is forced by grooved rollers into the threads of the screws, thus forming sleeves which extend only partially around the screws.

BRIEF FIGURE DESCRIPTION

In order that the invention may be more clearly understood, it will now be described, by way of example, with reference to the accompanying drawings, wherein:

FIG. 3 is an end view of a roller for forming the screw strip in accordance with the invention;

FIG. 4 is a cross sectional view of the roller of FIG. 3, taken along the lines IV—IV;

FIG. 5 is a view illustrating the use of the rollers of the type of FIG. 3 in the formation of a screw strip in accordance with the invention; and FIG. 6 is a top view of a modification of a screw strip in accordance with the invention.

DETAILED DESCRIPTION OF PREFERRED EXAMPLE EMBODIMENTS

Figure 1:
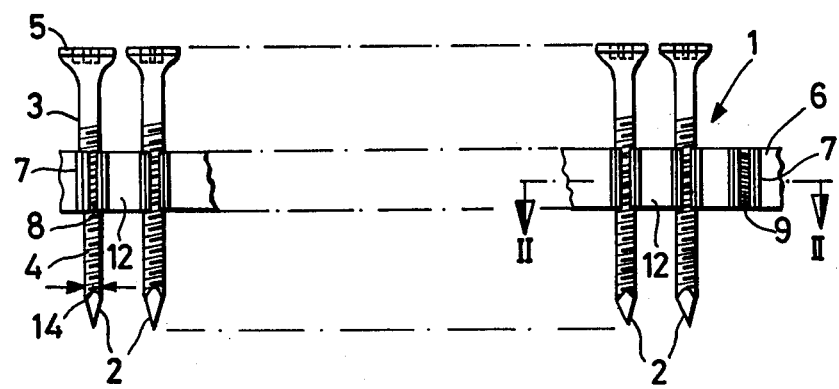
FIG. 1 is a side view of a screw strip in accordance with the invention with the strip holding screws therein.
Figure 2:
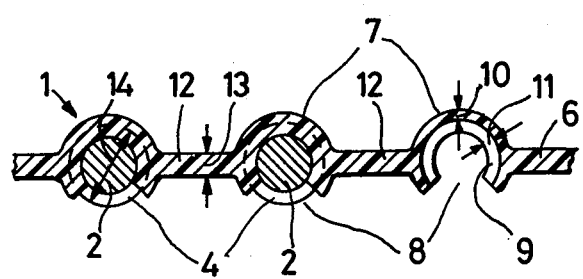
FIG. 2 is a cross sectional view of the screw strip of FIG. 1 taken along the lines II—II.

FIGS. 1 and 2 illustrate a screw strip 1 comprising a plurality of parallel, spaced apart, aligned screws 2 having shanks 3 provided with screw threads 4 in the normal manner. In the arrangement of the invention illustrated in FIG. 1, the screws 2 have heads 5, although it will be apparent that the screws may be of any conventional type even without heads. The screw shanks and threads may also be of any conventional form, and the invention is not limited to the use of screws of the type illustrated.

The screws 3 are interconnected by a retaining belt or strip 6 of flexible plastic material. In the arrangement illustrated in FIG. 1, this strip extends transversely of the longitudinal axes of the screws. Alternatively, if the screws are arranged in a staggered alignment, the belt or strip 6 may be slightly inclined to the longitudinal axes of the screws. In the arrangement of the invention illustrated in FIGS. 1 and 2, the strip 6 is formed with sleeves 7 which extend around separate screws through a peripheral angle of between 210° and 270°. As a result, each sleeve has a longitudinal slot 8 on one side of the screw strip. The sleeves 7 have internal threads 9 which mate the threads 4 of the screws. The wall thickness 10 of the sleeve 7 radially outside of the threads 4 of the screws is smaller than the depth 11 of the threads 4 of the screws 2.

The strip 7 further comprises lands or ribs 12 interconnecting adjacent sleeves. The ribs 12 extend in the center plane of the screw strip 1, which is more clearly apparent in FIG. 2. The planes of the ribs 12 extend through the longitudinal axes of the screws held by the adjacent sleeves. The wall thickness 13 of the ribs 12 is less than the outside diameter 14 of the threads 4 of the screws.

The screw strip of the present invention, as illustrated in FIGS. 1 and 2, is fed into a screwing appliance in the conventional manner. The first screw received in the appliance is thereby rotated, so that it turns in the mating thread of the respective sleeve, and advances in the direction of the workpiece. During this movement, the screw is securely guided by the sleeve in the direction of advance of the screws. If the screw has a head, as illustrated in FIG. 1, the head expands the sleeve when it reaches the sleeve during the screwing operation, so that the screw can be screwed completely into the workpiece without damaging the plastic strip. This result is achieved, because of the use of the flexible plastic material, which can be deformed upon advancement of the screw in the strip so that the sleeve is not broken, and is not separated from the strip, during the screwing operation. While the strip 6 is preferably made of a flexible plastic material, other flexible materials, such as suitable metals or paper may alternatively be employed, but polyethylene is preferred.

As a consequence, it is apparent that it is not required to provide guide jaws in the screwing appliance, in order to guide the screw, as was required in the use of frangible screw strips. In addition, since the strip 6 does not break, there is no danger of broken pieces of the strip being forced under the head of the screw, or marring the surface of the workpiece, or jamming.

It is of course apparent that the above described guiding of the screw, as well as the removal of danger of damage to the surface of the workpiece are achieved regardless of whether or not the screw has a head.

Since the sleeve only partially surrounds the screw thread, it can be easily pressed sideways by the screw head, tranversely of the direction of advance of the screw, so that it is easily moved out of the way. The thereby undamaged, empty retaining strip 6 consequently leaves the screwing appliance by way of a suitable opening, so that the strip or portions thereof cannot accumulate on the surface of the workpiece. Since the wall thickness of the interconnecting ribs 12 is less than the outside diameter of the screw thread, and since the wall thickness of the sleeves outside of the screw thread is smaller than the depth of the screw thread, the flexibility of the material of the strip is retained, so that the strip 6 may be easily deflected in the screwing appliance. It is thus apparent that the features in accordance with the invention result in a substantial reduction of cost in the use of the screwing appliance, and also enable the reduction of costs of the screwing appliance itself, by not requiring the use of guiding jaws.

The screw strip in accordance with the invention provides the further advantage that due to its flexibility, and the arrangement of the ribs in the center plane of the screw strip, the screw strip may be spirally or angularly wound. As a result, it is possible to employ the screw strip not only in flat magazines, but also in other forms of magazines. This provides the advantage that, when a differently formed magazine is provided, a larger number of screws can be processed in a screwing appliance, without the necessity of frequent reloading of the magazine.

The right hand sleeve of the screw strip illustrated in FIGS. 1 and 2 is shown without a screw in position. This depicts the undamaged form of the empty retaining belt or strip 6 as it leaves the screwing appliance by way of a suitable opening.

A conventional machine for the manufacture of fastener strips, known as a collator, may be employed in the formation of the screw strip in accordance with the invention. In the process of forming the screw strips, the screws 2 are suspended by their heads, and arranged in a row for feeding to a forming device. In the forming device, they are entrained by the grooves of a circulating conveyor chain. In accordance with the invention, when the strip is formed of a flexible plastic material, the plastic material is extruded from a nozzle only onto one side of the row of screws, to engage the screw threads of the screws. The strip 6 is then formed into the shape illustrated in FIGS. 1 and 2, by the use of at least one pair of forming rollers. As illustrated in FIGS. 3 and 4, a forming roller 20 for this purpose is provided with one or more longitudinally extending semi-circular grooves 21. These grooves have radii greater than the radius of the screw thread, so that the plastically molded plastic material can be forced to penetrate into the threads of the screw thread 4 and also to surround the screw threads to form the sleeves. The rollers 20 may also be provided with an annular groove 22, or alternatively, with angular ribs, intersecting the longitudinal grooves 21, for forming the ribs 12.

The process in accordance with the invention is shown generally in FIG. 5, wherein the extruded unformed portion 25 of the strip is shown as being disposed only on one side of a screw 2. The strip and the screws 2 are advanced to the right, as indicated by the arrow 26, to pass between a pair of rollers 27 of the type illustrated in FIGS. 3 and 4. The semi-circular longitudinally extending grooves 28 of these rollers are positioned to be in alignment as the screw 2 passes therebetween. As a consequence, the grooves 28 form the sleeves, by pressing the material of the strip 6 into the threads of the screws, and by plastically forcing the material to partially surround the opposite side of the screw.

It is, of course, apparent that the amount of plastic material extruded onto the sides of the screws is metered, such that a sufficient amount of plastic material is provided to enable the sleeve to be formed to surround the screw to the desired extent. Thus, as discussed above, it is preferred that the sleeve surrounds the screw through an angle of between 210° and 270°.

In the modification of the screw strip in accordance with the invention as illustrated in FIG. 6, the sleeves 30 of the screw strip are formed to completely surround the screws. In this arrangement, the portion 31 of the sleeves on one side of the screw strip is thicker than at least a portion 32 of the sleeve on the other side of the screw strip. The interconnecting ribs 33 are formed, as in the previously described embodiment of the invention, to have thicknesses less than the diameter of the threads of the screw 34.

In this embodiment of the invention, since one side of the sleeve is thinner than the other side thereof, the thinner side is broken by the advancement of the head of the screw in a screwing operation. Due to the flexibility of the strip, however, the other side of the sleeve is not broken, so that the plastic strip may be fed from the screwing appliance, through a suitable opening as in the above example, without leaving portions thereof on the surface of the workpiece.

Although the invention has been described with reference to specific example embodiments, it is to be understood, that it is intended to cover all modifications and equivalents within the scope of the appended claims.

What is claimed is:

1. In a unitary holding strip made of extruded plastics material comprising a plurality of screws retained in a row by said strip which defines a strip plane, said screws having longitudinal axes and a threading with a given outer thread diameter, said unitary holding strip including a plurality of screw holding sleeves and lands interconnecting said screw holding sleeves each of which extends along a portion of the threaded length of the respective screw in the longitudinal direction of the screw, the improvement wherein the wall thickness of said lands and the wall thickness of the sleeves are substantially equal to each other and substantially smaller than said outer thread diameter, wherein said lands interconnecting said sleeves extend in said strip plane, said screws having longitudinal axes substantially located in said strip plane, said sleeves and lands being formed by extruding said plastics material from one side only relative to said strip plane and perpendicularly to said longitudinal axes of the screws so that said sleeves non-uniformly surround said screws and form inwardly facing screw threads which closely conform to and hold said screw threading, said sleeves further comprising along the side opposite said one side thereof, substantially between said lands as a result of said non-uniform surrounding, an area of reduced strength such that a screw when it is being threaded into a workpiece is automatically screwed out of and separated from its sleeve while said sleeves and lands remain in one substantially intact strip, whereby each of said sleeves guides its screw by its inwardly facing screw threads as a screw is screwed out of its sleeve.

2. The strip of claim 1, wherein said area of reduced strength of said sleeve comprises gap means in said sleeve formed by only partially surrounding said screws on said one side of the sleeve, whereby each sleeve surrounds its screw along the entire length of the sleeve and circumferentially outside said gap means.

3. The strip of claim 2, wherein said gap means comprise a longitudinal slot on said one side of the sleeve.

4. The strip of claim 1, wherein said sleeves have a given wall thickness on one side and a thinner wall thickness on the opposite side of said sleeves, whereby the thinner wall thickness provides said area of reduced strength.

5. The strip of claim 1, wherein said sleeves only partially surround said screws to form said area of reduced strength.

6. The strip of claim 5, wherein sleeves enclose the screw threading with a peripheral angle within the range of about 210° to about 270°, whereby the sleeves have longitudinally extending slots.

7. The strip of claim 6, wherein all of said longitudinal slots extend on the same side of said strip.

* * * * *